US 6,718,055 B1

(12) United States Patent
Suri

(10) Patent No.: US 6,718,055 B1
(45) Date of Patent: Apr. 6, 2004

(54) TEMPORAL AND SPATIAL CORRECTION FOR PERFUSION QUANTIFICATION SYSTEM

(75) Inventor: Jasjit S. Suri, Mayfield Heights, OH (US)

(73) Assignee: Koninklijke Philips Electronics, N.V., Eindhoven (NL)

(*) Notice: Subject to any disclaimer, the term of this patent is extended or adjusted under 35 U.S.C. 154(b) by 544 days.

(21) Appl. No.: 09/730,355

(22) Filed: Dec. 5, 2000

(51) Int. Cl.⁷ .................................................. G06K 9/00

(52) U.S. Cl. .................... 382/128; 600/334; 600/358; 600/363

(58) Field of Search ............................... 382/128, 129, 382/130, 131, 132, 133, 134, 164, 165, 170, 192, 254, 255; 600/419, 420, 410, 437, 443, 449, 512, 431, 453, 507; 378/62, 98; 250/303; 324/307, 309

(56) References Cited

U.S. PATENT DOCUMENTS

| | | | |
|---|---|---|---|
| 5,040,225 A | | 8/1991 | Gouge |
| 5,048,340 A | | 9/1991 | Thompson et al. |
| 5,150,292 A | * | 9/1992 | Hoffmann et al. ........... 600/431 |
| 5,153,926 A | * | 10/1992 | Jansson et al. .............. 382/128 |
| 5,402,785 A | * | 4/1995 | Leigh et al. ................ 600/419 |
| 6,094,050 A | * | 7/2000 | Zaroubi et al. ............. 324/309 |
| 6,341,179 B1 | * | 1/2002 | Stoyle et al. ............... 382/254 |
| 6,377,835 B1 | * | 4/2002 | Schoenberg et al. ........ 600/419 |
| 6,466,687 B1 | * | 10/2002 | Uppaluri ..................... 382/128 |

OTHER PUBLICATIONS

Cerebral MR Perfusion Imaging (portions); Gregory Sorensen, 1999.
Journal of Computer Assisted Tomography, Nov./Dec. 1991; Cardiac First–Pass and Myocardial Perfusion in Normal Subjects Assessed by Subsecond Gd–DTPA Enhanced MR Imaging—Paul van Rugge, et al.

(List continued on next page.)

*Primary Examiner*—Jayanti K. Patel
*Assistant Examiner*—Abolfazl Tabatabai
(74) *Attorney, Agent, or Firm*—Fay, Sharpe, Fagan, Minnich & McKee, LLP

(57) ABSTRACT

A medical imaging system includes an imaging device for producing temporally spaced image representations, a memory for storing the image representations, and a processor. The processor aligns the image representations by iteratively deriving a transform between progressively smaller sub-sets of pixels in temporally adjacent images until the sub-sets converge, and, applies the transform to the temporally adjacent images. The processor further sorts selected pixels in a region of interest spatially within each of the image representations for further processing by classifying pixels in the images according to a characteristic indicative of an absorption rate of the contrast agent. The processor further establishes correspondence between the selected pixels over successive image representations by generating masks for a particular classification of pixels, based on the generated masks, computing textural properties of the particular classification of pixels across the temporally spaced images, and computing co-occurrence matrices between successive image representations based on the textural properties. The processor further determines and displays a curve indicative the contrast agent in the selected pixels over time.

20 Claims, 5 Drawing Sheets

OTHER PUBLICATIONS

Medical Image Analysis, 1998; Motion and Deformation Tracking for Short–Axis Echo–Planar Myocardial Perfusion Imaging—Guang–Zhong Yang, et al.

Segmentation of MR Images by a Fuzzy C–Mean Algorithm; Lab. for Clinical and Experimental Image Processing; M. Ramze Rezaee, et al. (1995).

A Generalized EM Algorithm for Robust Segmentation of Magnetic Resonance Images; Dzung L. Pham and Jerry L. Prince (1999).

An Automated Technique for Statistical Characterization of Brain Tissue in Magnetic Resonance Imaging; Dzung Pham, et al. (1997).

International Journal of Computer Vision, 1997; Alignment by Maximization of Mutual Information—Paul Viola and William M. Wells, III.

To appear in Medical Image Analysis, 1996; Multi–Modal Volume Registration by Maximization of Mutual Information—William M. Wells, III, et al.

Part of the SPIE Conf. on Image Processing, 1998; A Multiscale Approach to Mutual Information Matching—Josien P. Pluim, et al.

IEEE Transactions on Medical Imaging, 1995; Automatic Registration of CT and MR Brain Images Using Correlation of Geometrical Features—Petra A. Van den Elsen, et al.

Journal of Computer Assisted Tomography, 1992; Temporal Correlation Images Derived from Sequential MR Scans—Jadwiga Rogowska and Gerald L. Wolf.

Point–Based Rigid Registration: Clinical Validation of Theory; Jay B. West, et al. (2000).

IEEE Transactions on Systems, Man, and Cybernetics, 1973; Textural Features for Image Classification—Robert M. Haralick, et al.

IEEE Transactions on System, Man, and Cybernetics, 1976; A Comparative Study of Texture Measures for Terrain Classification—Joan S. Weszka, et al.

Proceedings of the IEEE, 1979; Statistical and Structural Approaches to Texture—Robert M. Haralick.

IEEE Transactions on Pattern Analysis and Machine Intelligence, 1980; Decorrelation Methods of Texture Feature Extraction—Olivier D. Faugeras and William K. Pratt.

IEEE Transactions on Computers, 1972; Texture Measures for Automatic Classification of Pulmonary Disease—Richard N. Sutton and Ernest L. Hall.

IEEE Transactions on Pattern Analysis and Machine Intelligence, 1981; An Empirical Evaluation of Generalized Cooccurrence Matrices—L.S. Davis, et al.

* cited by examiner

TEMPORAL AND SPATIAL CORRECTION FOR PERFUSION QUANTIFICATION SYSTEM

BACKGROUND OF THE INVENTION

The present invention relates to the medical imaging arts. It finds particular application in the area of detecting and quantifying the perfusion of an amount of medical imaging contrast agent through a region of interest delineated either manually, automatically, or semi-automatically.

There are many imaging modalities which give useful information when used for diagnostic imaging. The most widely used are X-rays CT, PET, SPECT and Magnetic Resonance (MR). The advent and wide use of contrast agents injected into the human body, such as Gadolinium, or Gad have enhanced the diagnostic utility such as in x-rays, CT, PET and MR. See e.g. U.S. Pat. No. 4,957,939 to Gries et al., entitled Sterile Pharmaceutical Compositions of Gadolinium Chelates Useful Enhancing NMR Imaging. When contrast agents are employed, it becomes significant to track their ability to perfuse in the tissues, so-called, perfusion through the region of interest. Indeed, this has given rise to the field of perfusion engineering which has played a vital role in early cancer detection and therapy.

While the use of contrast agents and MR scans has been in use for some time, especially in the area of brain scans, other regions of interest provide additional difficulties. For example, during a brain scan the brain can be held fairly stationary. On the other hand, breast, kidney and cardiac tissue tend to move during the exam, such as with the respiratory cycle. The motion includes rigid or translation motion as well as affine or nonrigid motion, such as flexing, rolling, compressing, and other nonlinear motions associated with soft tissue.

Additionally, contrast agents tend to be absorbed at different rates depending on tissue type. Again, while this is rarely a difficulty in the brain environment, the presence of different kinds of tissue classes such as glands, ducts, fat, ligaments, bone and the like introduce image processing requirements that quickly overcome even the most powerful imaging computers. Indeed, the images tend to be volume images of significant size. For example, for breast imaging, the image data set is large enough to encompass the entire breast. Moreover, in order to detect cancers in ducts and other fine regions, a resolution on the order of a cubic millimeter per pixel is desirable.

Thus, different contrast agent uptake rates and computationally expensive image processing, typically result in fitting mathematical models to estimate the contrast uptake curve. For example, researchers have tried modeling the ratio of measured signal intensity after the contrast injection to the pre-contrast signal intensity using the kinematics of the uptake based on exponential models. Some have proposed the compartmental model for this, others have used the Marquart algorithm for the analysis.

The present invention contemplates a new, improved method and apparatus for perfusion quantification and diagnostic imaging which overcomes the above-referenced difficulties and others.

SUMMARY OF THE INVENTION

In accordance with an embodiment of the present invention, a method of medical imaging includes correcting for motion in a series of temporally spaced images. A plurality of pixels are selected in a region of interest spatially within each of the images based on common characteristics of the pixels and for the selected pixels, a contrast agent uptake curve is computed indicative of a presence of the contrast agent in the pixels over time.

In accordance with another aspect of the present invention, the method further includes verifying correspondence of the selected pixels in each of the temporally spaced images.

In accordance with another aspect of the present invention, the selecting step includes classifying pixels in the region of interest based on a determinable tissue characteristic.

In accordance with another aspect of the present invention the selecting step further includes selecting one of the classifications of pixels as a class of pixels expected to react with the contrast agent.

In accordance with another aspect of the present invention the correcting step includes identifying a sub-set of pixels in each temporally spaced image, and deriving a relationship between successive sub-sets to describe motion between temporally spaced images.

In accordance with another aspect of the present invention the identifying step includes successively down sampling and smoothing pixels into progressively smaller sub-sets of pixels in the temporally spaced images until successive sub-sets converge.

In accordance with another aspect of the present invention the correcting step further includes minimizing entropy of the sub-set of pixels between successive temporally spaced images.

In accordance with another aspect of the present invention the verifying step includes computing co-occurrence matrices between successive images based on texture, each co-occurrence matrix indicative of similarity of contrast agent perfused pixels in successive images.

In accordance with another aspect of the present invention the method further includes generating binary masks from pixel classifications in the region of interest for establishing textural correspondence of the selected pixels.

In accordance with another aspect of the present invention the method further includes computing textural properties of the selected pixels from the generated binary mask.

In accordance with another embodiment of the present invention, a diagnostic imaging system includes an image memory for storing a plurality of temporally spaced digital image representations reconstructed from diagnostic data generated by an imaging device. The system further includes a perfusion processor including a motion correcting algorithm that registers the plurality of digital image representations, a filtration algorithm that spatially classifies pixels in a region of interest on each of the digital image representations, and a verification algorithm which establishes correspondence between selected classified pixels over successive digital image representations.

In accordance with another aspect of the present invention the motion correcting algorithm includes first and second windows including a selected number of pixels from a first digital image representation. The system further includes a comparator which recursively compares the first window and the second window until differences are minimized.

In accordance with another aspect of the present invention the comparator includes a transform defining a relationship between pixels in the first window and the second window when the differences are minimized, the comparator applying the transform to the digital image representations.

In accordance with another aspect of the present invention the filtration algorithm includes an algorithm which assigns a value to each pixel in the image representation based on a characteristic of the pixel. The filtration algorithm also includes an algorithm which selects pixels representing a characteristic of interest, and an algorithm which excludes pixels of other than the selected pixels.

In accordance with another aspect of the present invention the verification algorithm includes a co-occurrence matrix process which computes matrices based on a texture parameter of the selected pixels across successive image representations.

In accordance with another embodiment of the present invention, a medical imaging system includes an imaging device for producing a plurality of temporally spaced image representations, a memory for storing the image representations, and a processor for manipulating the image representations for viewing on a display. The processor being controlled by the computer implemented steps of: (a) aligning the plurality of temporally spaced image representations; (b) sorting selected pixels in a region of interest spatially within each of the image representations for further processing; (c) establishing correspondence between the selected pixels over successive image representations; and, (d) determining a curve indicative of a presence of a contrast agent in the selected pixels over time.

In accordance with another aspect of the present invention the computer implemented aligning includes iteratively deriving a transform between progressively smaller sub-sets of pixels in temporally adjacent image representations until the sub-sets converge, and, applying the transform to the temporally adjacent images representations.

In accordance with another aspect of the present invention the computer implemented sorting includes classifying pixels in the image representations according to a characteristic indicative of an absorption rate of the contrast agent.

In accordance with another aspect of the present invention the computer implemented establishing includes generating masks for a particular classification of pixels, computing textural properties of the particular classification of pixels across the temporally spaced image representations based on the generated masks, and computing co-occurrence matrices between successive image representations based on the textural properties, each co-occurrence matrix indicative of contrast agent perfusion in pixels of adjacent image representations.

The current invention removes the two major problems of the perfusion quantification system. The first problem is the motion correction and the second problem is the filtration of the un-enhanced pixels in the region of interest selected. The first problem of motion correction or motion compensation corrects the post Gad temporal images using a mutual information technique based on parzen window estimates. This algorithm uses a multi-resolution approach for correction, so it is "multi-resolution image registration" method. The second problem of removing the un-enhanced pixels is called filtration which basically removes the pixels in the ROI which do not contribute in the quantification process. This filtration process in done image by image and hence is a spatial correction method. But since we introduce our two major methods in this invention, we also need to verify if they are functioning. For that we introduce a verification process based on textural correspondence and texture energy. Once verified, one can do the statistical analysis, perfusion quantification and lesion characterization.

For example, given temporal and spatial MR data, the MR data set first undergoes the temporal correction using mutual information/entropy and stochastic gradient algorithm. The registered images undergo region of interest extraction to compute the object of interest, say breast in the MR breast images or LV in the cardiac MR images. The ROI could be manual or automatic. Now in the region of interest, we look for different classes, which contribute to the enhancement of the pixels by Gad. This pixel classification could be a Bayesian classifier or any clustering approach. During this process some pixels are filtered out which do not receive any Gad. The selected sub-regions are the regions which contribute to the enhancement of the pixels. To ensure that the sub-regions accurately contribute over the temporal course, we compute the texture energy of these sub-regions which are in close relationship for the temporal sequence. Finally the enhanced pixels are quantified by computing its statistical properties like mean, standard deviation and variance. These measures are computed for the ROI in the temporal domain and the curve is estimated. The slope of these curve decide the malignancy type present in the tissue.

One advantage of the present invention resides in the accurate computation of the enhanced or perfused pixels in the region of interested selected.

Another advantage of the present invention resides in removing the error in perfusion quantification which comes from the movement of the patients due, for example, to breathing.

Another advantage of the present invention resides in removing the error in the perfusion quantification based on the ability of a tissue to absorb the Gad.

Another advantage of the present invention resides in fast computation of the motion compensation due to the multi-resolution approach.

Another advantage of the present invention resides in the internal validation system based on the regional correspondence and texture energy.

Another advantage of the present invention resides in the display of the perfusion quantified regions (so-called uptake curves) indicative of the ability of a lesion to absorb the Gad.

Another advantage of the present invention resides in the ability to detect lesion over the corrected spatial and temporal perfusion data sets.

Another advantage of the present invention resides in the ability to change the region of interest to an automatic segmentation process for lesions and then doing the quantification.

Other advantages and benefits of the invention will become apparent to those skilled in the art upon a reading and understanding of the preferred embodiments.

BRIEF DESCRIPTION OF THE DRAWINGS

The invention may take physical form in certain parts and arrangements of parts, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
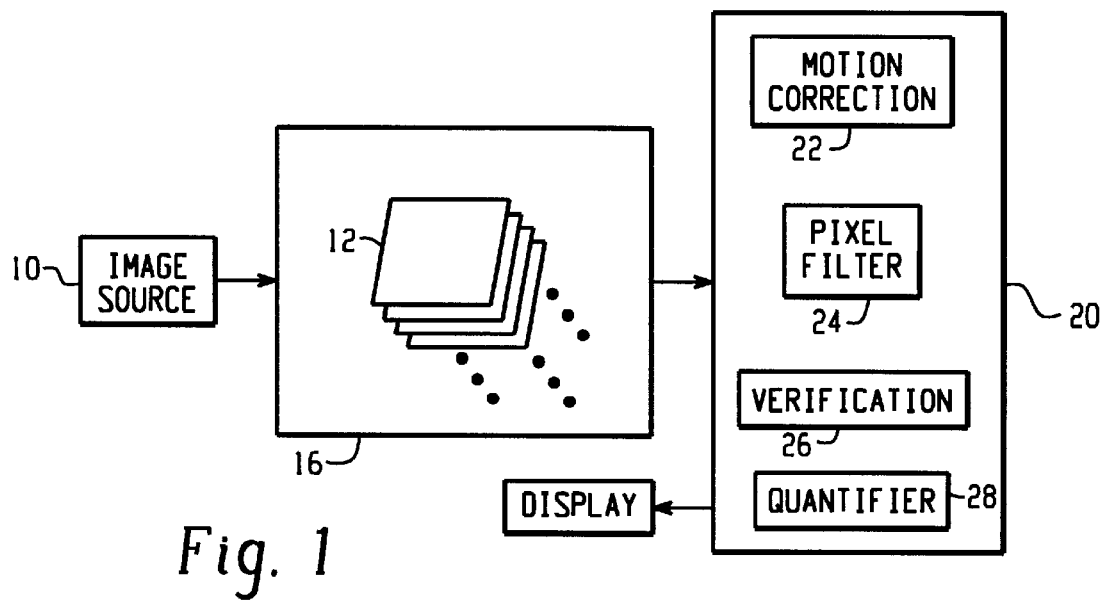
FIG. 1 is an overview apparatus suitably configured to practice the present invention.

Referring initially to FIG. 1, an exemplary medical imaging apparatus suitable to practice the present invention includes an imaging source 10 which generates a series of temporally spaced image representations 12. While the discussion above has focused on MR scans, those skilled in the art will appreciate that any source of imaging data (e.g. X-rays CT, PET, SPECT and the like) will function with equal efficacy where specific contrast agents are employed or tailored to the imaging modality used. The image representations are stored in an image memory 16 for subsequent processing and/or display. A perfusion processor 20 is in data communication with the memory 16 and includes four components:

1) a motion correcting algorithm 22 that applies a temporal correction, alignment or registration of the plurality of digital image representations, such as the pre- and post contrast images;
2) a filtration algorithm 24 that spatially classifies or filters pixels in a region of interest on each of the digital image representations in spatial domain;
3) a verification algorithm 26 which establishes regional correspondence between selected classified pixels over successive digital image representations in temporal domain; and,
4) a quantification perfusion algorithm 28 where the statistical analysis of the filtered regions is performed and uptake curves of Gad's ability to perfuse in tissues are generated.

Figure 2:
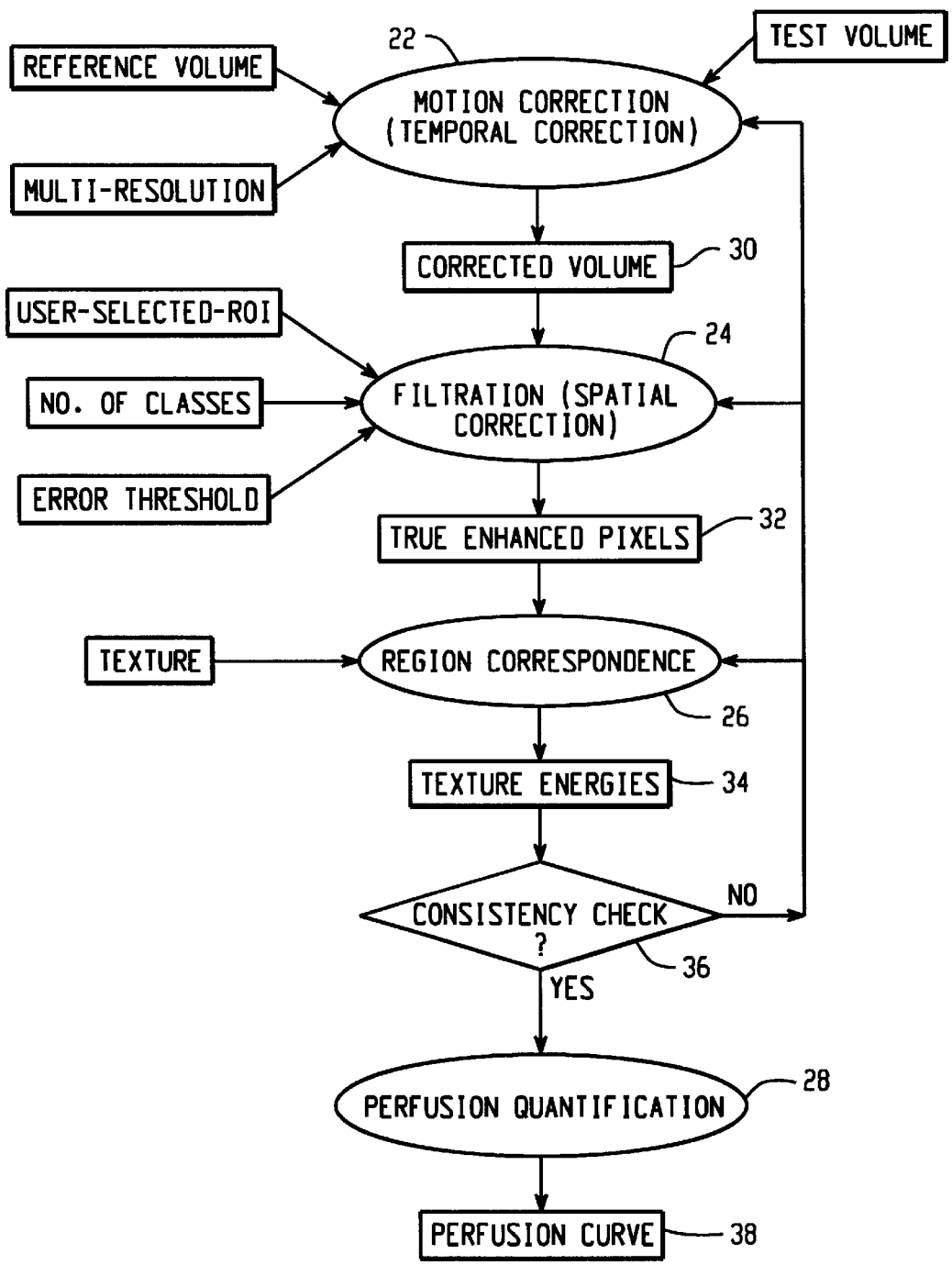
FIG. 2 is a system level overview of operations of the processor of FIG. 1.

With reference now to FIG. 2, an object-process flowchart illustrates a functional relationship of the four components. Following a brief description here of each of the components, a more detailed discussion is provided with components broken out separately. The motion correcting algorithm 22 corrects the images for motion induced during the collection of the temporally spaced image representations. This motion can be from any of a variety of sources such as respiration, muscle flex and the like. This motion correction can alternately be seen as image correction or image alignment where the images of the post Gad contrast are registered with respect to the pre-contrast images/volume. A correction method uses the maximization of mutual information, while a registration process uses the multi-resolution approach for correction. Generally, this approach iteratively shrinks or reduces the size along with smoothing of the images by half until the images are registered. Details of these methods will be more fully discussed below. The output of the motion correcting algorithm 22 is the corrected temporal sequence 30.

The corrected temporal sequence 30 is provided to the filtration algorithm 24 that spatially classifies or filters pixels in a region of interest on each of the temporally spaced digital image representations. In other words, filtration algorithm 24 filters out the pixels which do not contribute to the image enhancement or which has not perfused in the tissue. This has the desirable effect of reducing image processing loading by ignoring pixels that are determined to be of little consequence to the contrast agent detection. These pixels are only searched in the region of interest as specified for all the temporal frames of the image sequence. The remaining or contributing pixels 32 are selected, converted to binary regions and passed for further processing such as region correspondence 26 and perfusion quantification 28.

With continued reference to FIG. 2, the contributing pixels 32 are forwarded to the a verification algorithm 26 which establishes regional correspondence between the selected or contributing classified pixels over successive digital image representations. Thus, the verification algorithm 26 takes binary regions as input from each of the temporal sequence images and computes textural properties 34 of the selected regions. The textural properties 34 of each of these regions are checked for consistency 36 such as a monotonic pattern or other closely related properties among sequential image representations and, if consistent are passed to the quantification perfusion algorithm 28. If not consistent, the regions are fed back into the prior algorithms 22, 24 and 26 until consistency is achieved.

The verified regions are then provided to the quantification perfusion algorithm 28 where the statistical analysis of the filtered regions is performed and uptake curves of contrast agent are generated. Here the mean, variance, standard deviation and slopes of the filtered regions are computed in the temporal sequence and lesions are characterized.

Figure 3:
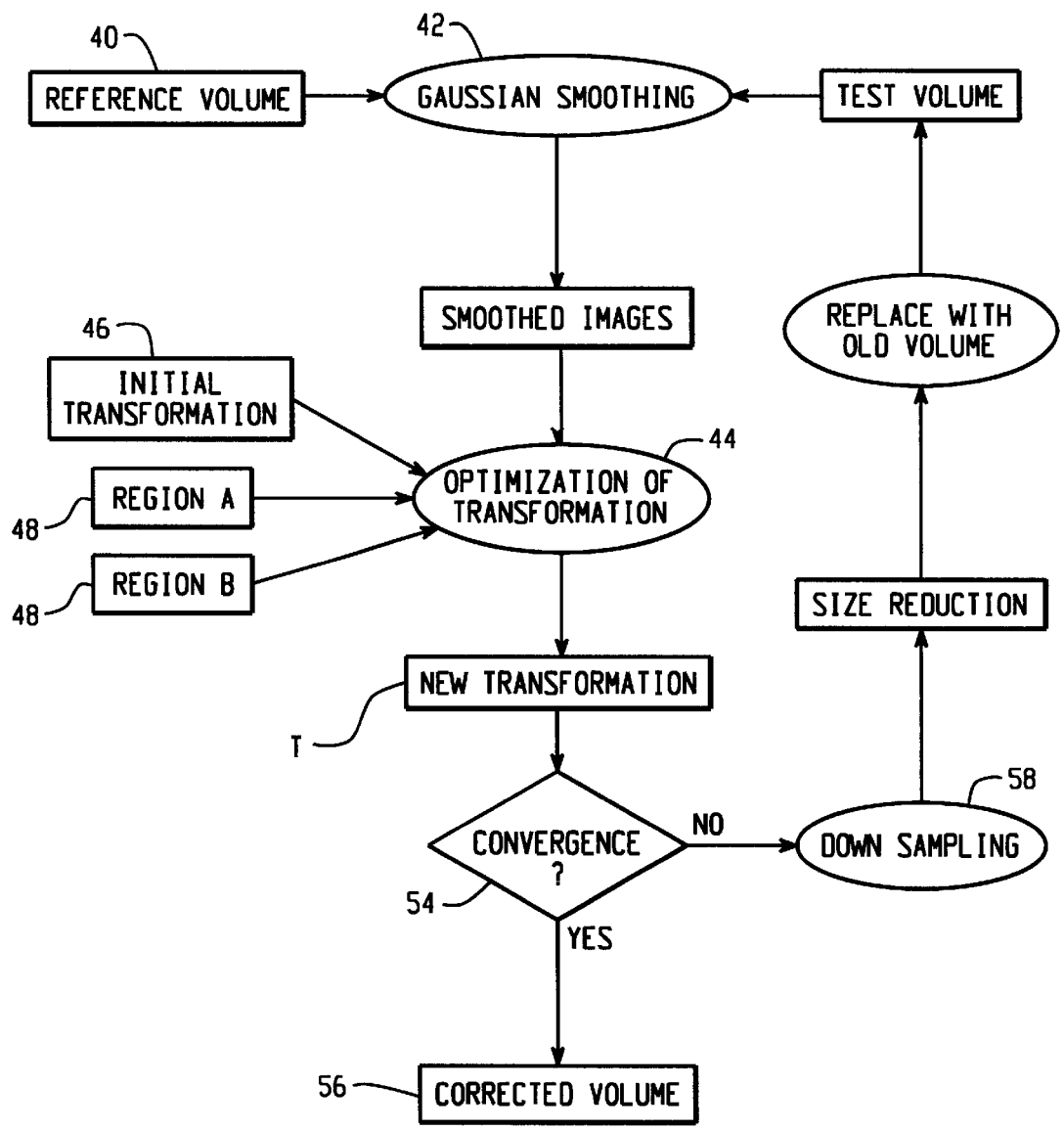
FIG. 3 is an object-process diagram of a component of FIG. 2.

With reference now to FIG. 3 (your FIG. #5), a detailed illustration of an embodiment of the motion correcting or temporal correction algorithm 22 is shown. The initial or reference data volume 40 undergoes smoothing 42, followed by the optimization of the transformation parameters 44. The optimization of the transformation parameters 44 is achieved given the initial transformation 46, and two regions 48 from the reference image volumes. The output is a new transformation matrix T. An alignment algorithm 54 checks for the convergence by comparing the previous T with the new T (over an average) and if the convergence is achieved, the system exits and computes the new registered volume 56.

If convergence is not achieved, then the test volume undergoes the down sampling or image size reduction along with smoothing 58 and the process is repeated, until the convergence is achieved.

More particularly, convergence is determined by minimizing the entropy or disorder among successively smaller sub-sets of image pixels. This is represented mathematically with the equation shown below of the entropy of a point in an image using the Gaussian function $G_\psi$. The probability density estimate given the parzen window estimate $\Psi$ is given as:

$$p(x) = \frac{1}{N_a} \sum_{xi \in A} G_\psi(x_i - x_j)$$

where $G_\psi$ is defined as:

$$G_\psi(z_i - z_j) = \frac{1}{\sqrt{2\Pi}\psi} \exp\left[\frac{(z_i - z_j)2}{\Psi}\right]$$

The entropy is defined as:

$$h(x) = -E_\alpha[\log(p(x))]$$

The expectation value is approximated by averaging over evaluation of p(x) by taking averaging over another set of random samples B of size $N_b$. Thus the entropy expression is given as:

$$h(x) = -\frac{1}{N_b} \sum_{xj \in B} \log[p(xj)]$$

Substituting the value of p(x) in the above expression we get the entropy h(z) as:

$$h(z) = -\frac{1}{N_b} \sum_{xi \in B} \log\left[\frac{1}{N_a} \sum_{xj \in A} G_\psi(z_i - z_j)\right]$$

where, $G_\psi$ is defined as:

$$G_\psi(z_i - z_j) = \frac{1}{\sqrt{2\Pi}\psi} \exp\left[\frac{(z_i - z_j)2}{\Psi}\right]$$

Image registration can also be accomplished through Mutual Information/entropy and stochastic gradient algorithms to register the post-contrast Gad images. Mutual information is defined mathematically as:

$$I=h(u)+h(v)-h(u,v)$$

where, h (u) and h(v) are the entropies of random variables u and v, while h(u,v) is the joint entropy. For estimating the best transformation, we need to find the rate of change of mutual information I. Thus the equation for new transformation is given as:

$$T_{i+1} = T_i + \lambda\left(\frac{dI}{dT}\right)$$

where λ is the learning rate or smoothing constant.

An expression of rate of change of mutual information dI/dT is achieved by taking the derivative of h(u), h(v) and h(u,v) with respect to T, the transformation. Since u is independent of T, the rate of change of h(u)/dT=0. The only components which contribute to the dI/dT are the h(v) and h(u,v). We here show the expression of d(h(v(T(x)))/dT and the same can be applied to d(h(u,v(T(x))))/dT.

Using the property of derivative of logarithm and exponentials d(h(u(T(x)))/dT can be given as:

$$\frac{\partial}{\partial T} H[v(T(x))] = -\frac{1}{N_b} \sum_{xj \in B} \sum_{xi \in A} W_v(vi, vj) \frac{(vj - vi)}{\psi_v} \frac{\partial}{\partial T}(vj - vi)$$

where, vi=v(T(xi)) and, vj=v(T(xj)).

Performing a similar operation for the joint entropy h(u,v), we get the expression as:

$$\frac{\partial}{\partial T} H[w(u, v(T(x))] =$$
$$-\frac{1}{N_b} \sum_{xj \in B} \sum_{xi \in A} W_{uv}(w_i, w_j) \frac{(wj - wi)}{\psi_{uv}} \frac{\partial}{\partial T}(v_j - v_i)$$

Joining the above two terms and plugging in the derivative of mutual information, we get:

$$\frac{dI}{dT} = -\frac{1}{N_b} \sum_{xi \in B} \sum_{xj \in A} (vi - vj) \left[\frac{W_v(vi, vj)}{\psi_v} - \frac{W_{uv}(w_i, w_j)}{\psi_{uv}}\right] \frac{d(v_i - v_j)}{dT}$$

d/dT ($v_i-v_j$) an important component in the above equation is given as:

$$d/dT (v_i-v_j) = \nabla[v((T(X_i))]X_i^T$$

Where T is the transformation and T is the transpose.

This expression is given as:

$$d/dT(v_i - v_j) = d/dT(v_i) - d/dT(v_j)$$
$$= d/dT(v[T(x_i)]) - d/dT(v[T(x_j)])$$
$$= \underbrace{[\nabla_x v_i \nabla_x v_j \ 1]^T}_{3\times 1} \underbrace{[x_i \ y_i \ 1]}_{1\times 3} - \underbrace{[\nabla_x v_j \ \nabla_x v_j \ 1]^T}_{3\times 1} \underbrace{[x_i \ y_i \ 1]}_{1\times 3}$$

Accordingly, the convergence decision 54 is reached when the solution to the difference between the resulting 3×3 matrices does not change over a course of iterations.

Figure 4:
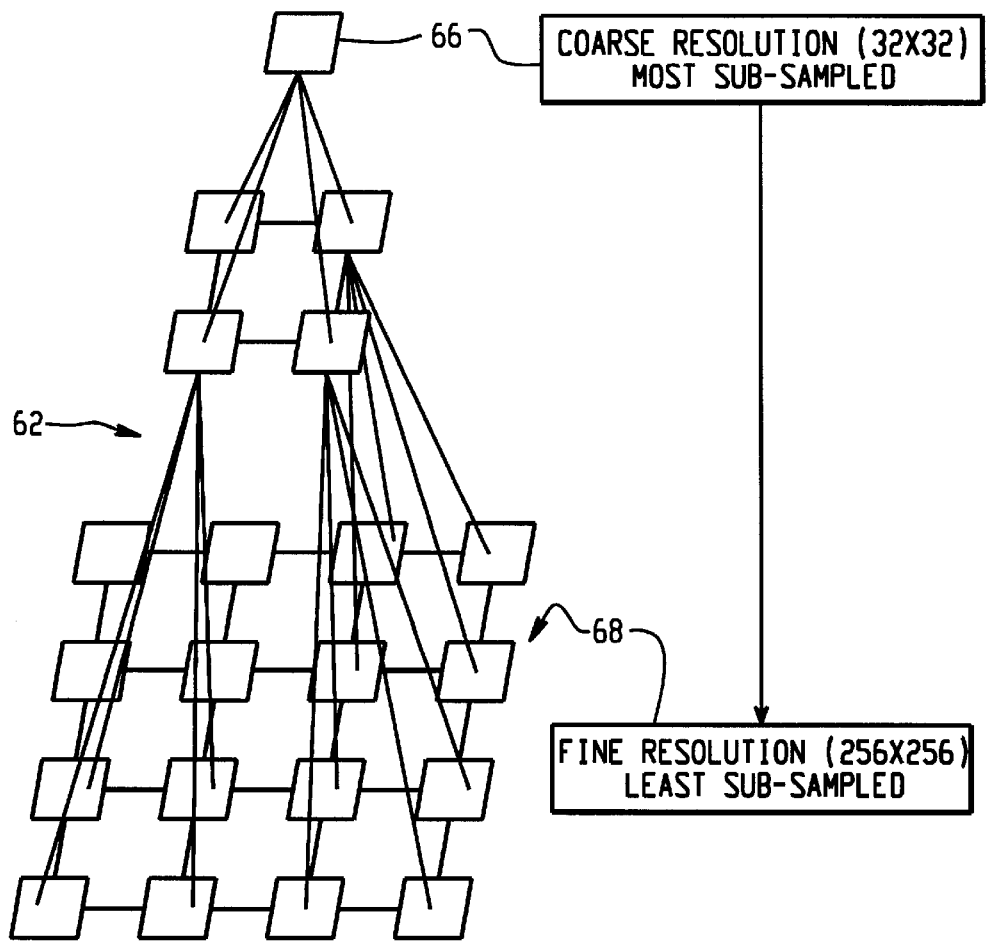
FIG. 4 is an exemplary illustration of down-sampling an image representation.

Referring now to FIG. 4, the registration is performed in a coarse-to-fine fashion on a hierarchy of images that are generated by successive smoothing 42 (FIG. 3) and reduction 58 (FIG. 3). Smoothing is performed by convolving the binomial kernel {1,4,6,4,1} and subsequent reduction is accomplished by deleting alternating samples. This scheme generates an approximation to a 'Gaussian Pyramid' 62 representation of the data. For Pyramid generation from the multi-resolution algorithm, the Gaussian pyramid progression from coarse 66 to fine 68 is given as:

Gaussian Filtration: the image is convolved with the 2-D Gossip filter (so called blurring). The filter [1 4 6 4 1] is convolved horizontally and then vertically.

Down sampling: The image is sampled by a factor of 2 to select the alternate pixels points and reduce the image.

The multi-resolution temporal correction technique of the perfusion data has the following advantages:

1) It increases the capture range of the method: at the lower resolutions there is less tendency to become trapped in local minima, but the resulting accuracy is reduced;
2) It saves time and memory since the images are small in size;
3) It increases the signal to noise ratio; and
4) It separates objects of different sizes on different levels.

This algorithm is applied during the registration process.

Figure 5:
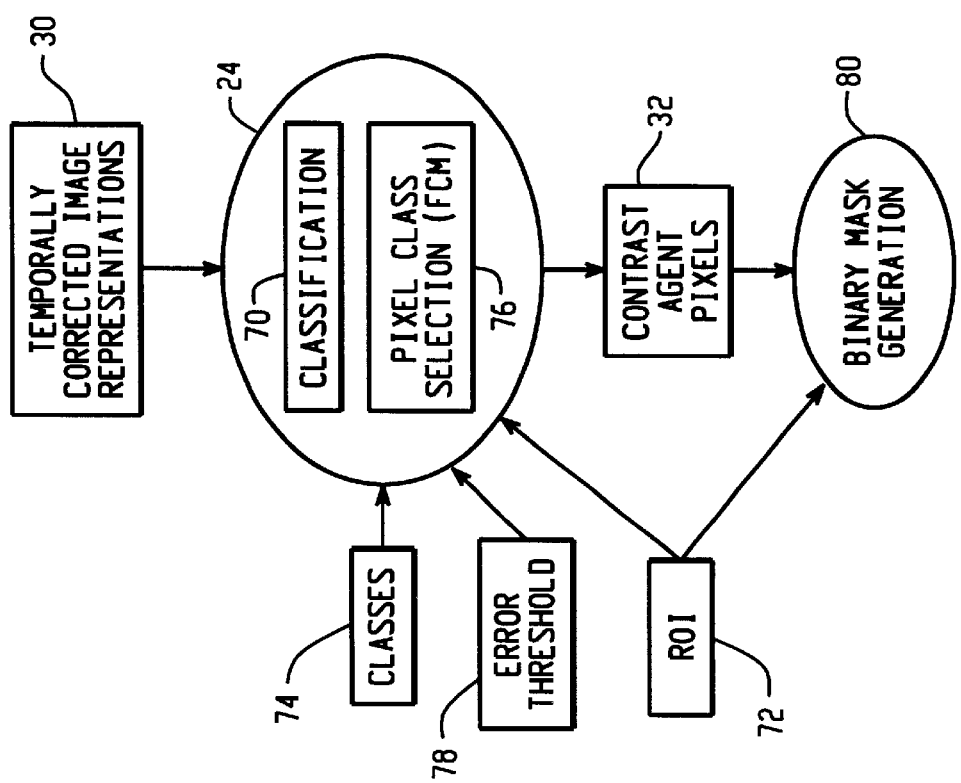
FIG. 5 object-process diagram of a component of FIG. 2.

Having done the motion correction, reference is now directed to FIG. 5, where an exemplary object-process chart describes the filtration algorithm 24 or the spatial correction. Here, the temporally corrected image 30 is classified on a pixel level. A classification algorithm 70 selects or sorts pixels in a region of interest 72 into a set of defined classes 74 based on tissue type or determinable criteria. Those skilled in the art can now appreciate that the region of interest 72 can be manually input or developed from automated image analysis apparatus. The number of defined classes 74 is typically the same as the number of tissue types. However, recognizing that each pixel may belong to more than one class, a fuzzy membership function (FCM) 76 is used to associate each pixel in the image with a particular class 74. There are several algorithms to compute the membership functions and one of the most efficient is the FCM 76 based on clustering techniques. Because of the ease of implementation for spectral data, it is preferred over other pixel classification algorithms.

The FCM algorithm 76 computes the measure of membership terms as a fuzzy membership function. For example, where the observed pixel intensities in a multi-spectral image at a pixel location "j" is given as:

$$Y_j=[y_{j1}Y_{j2}\ldots,Y_{jN}]^T$$

where j took the pixel location and N were the total number of pixels in the data set. In FCM, the algorithm iterates between computing the fuzzy membership function and the centroid of each class. This membership function was pixel location and for each class (tissue type) and the value of the membership function lies between the range 0 and 1. This membership function represents the degree of similarity between the pixel vector at a pixel location and the centroid of the class.

For example, a membership function value close to 1, indicates that the pixel at the pixel location is close to the centroid of the pixel vector for that particular class. The algorithm can be presented in the following four steps: If $u_{jk}^{(p)}$ is the membership value at location j for class k at iteration p, such that $\Sigma u_{jk}=1$. As defined above, $y_j$ is the observed pixel vector at location j, and $v_k(p)$ is the centroid of class k at iteration p, then the FCM steps for computing the fuzzy membership values are:

(i) Choose number of classes (K) 72 and the error threshold ($e_{th}$) 78 and set the initial guess for centroids, $v_k(0)$ and set the iteration number p=0.

(ii) Compute the fuzzy membership function given by the equation:

$$u_{jk}^{(p)} = \|y_j - v_k^{(p)}\|^{-2} / \Sigma \|y_j - v^{(p)}\|^{-2}$$

where j=1, ... M and k=1, ... K.

(iii) Compute the new centroids using the equation:

$$v^{(p+1)} = \{\Sigma (u_{jk}^{(p)})^2 y_j\} / \Sigma (u_{jk}^{(p)})^2$$

(iv) Check convergence by computing the error between the previous and current centroids, if the algorithm had converged, then exit, else, increment p and go to step (ii) for computing the fuzzy membership function again. The output of the FCM algorithm was K sets of fuzzy membership function again. Thus if there were K classes, then we threw out K number of images and K number of matrices for the membership functions.

Following pixel classification 24, the labeled pixels 32 are provided to generate a binary mask 80. This binary mask will be used for regional correspondence and verification (26, FIG. 2). Note that the binary mask generation process only takes place in the region of interest 72. The binary mask of enhanced pixels is then provided to the verification algorithm 26, more fully discussed below.

Additionally, once the fuzzy membership values are computed for each pixel/voxel location in the image, a contributing factor of each type for a given pixel/voxel is indicated. Using statistical properties, an estimate of that pixel can be labeled in the process of enhancement process during the contrast uptake. Thus, the output of the classifier is an enhancement labeling process. Those familiar with the field of pixel classification will appreciate the major advantages of clustering over Bayesian training models. The Bayesian model yields a probability of a class being present when a sample pixel is observed, the so-called a posteriori probability.

Figure 6:
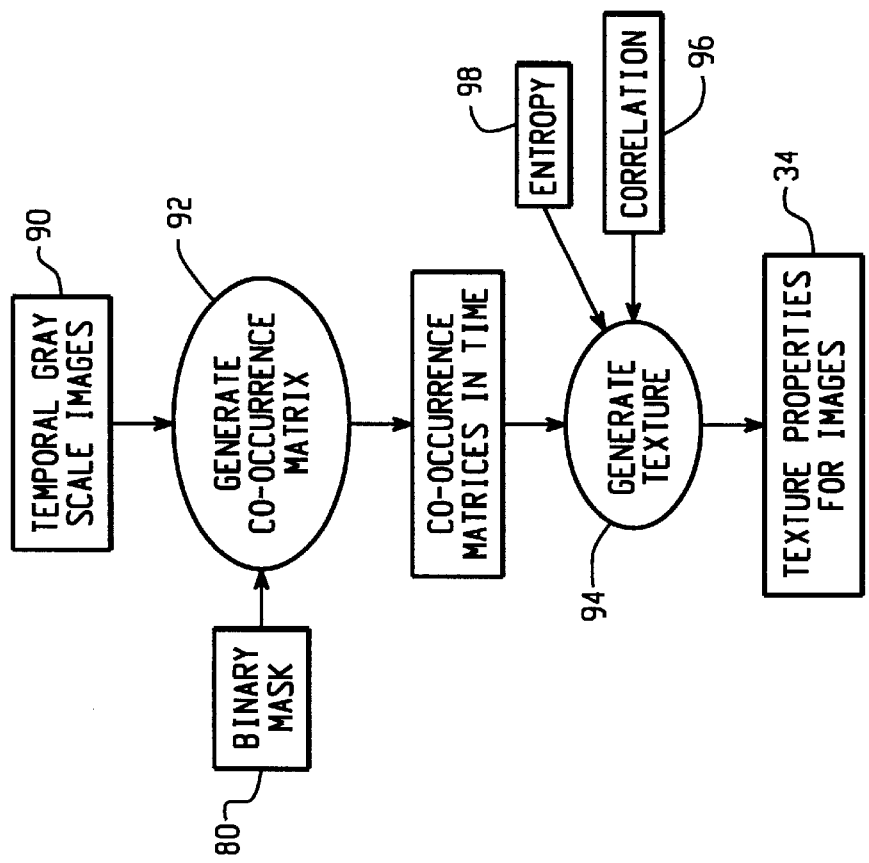
FIG. 6 is an object-process diagram of a component of FIG. 2.

With reference now to FIG. 6, an embodiment of the verification algorithm 26 which establishes correspondence among selected pixel areas over successive digital image representations is detailed. Here, the binary gray scale regions 90 from each of the temporal sequence images are checked if the textural properties of each of these regions have monotonic or unvarying patterns or other closely related properties.

Specifically, the binary regions 90 from frame to frame carry textural information about the GAD or contrast agent flow pattern. This flow information, in the form of texture energy gives a tool to establish a correspondence between successive frames in the temporal sequence. In a preferred embodiment a method of computing texture on binary images is based on the marginal probability of the region of interests having a set of textural features for classifying the images.

Texture properties are computed by first generating the co-occurrence matrix 92 of the gray scale image 90 given the binary mask 80. It consists of two steps: Step one consists of co-occurrence matrix generation 92 and step two consists of computing the textural properties 94. The textural properties include computation of statistical properties such as Marginal properties, correlation 96 and entropies 98, recalling computation of the statistical properties on the perfused pixel are obtained from the pixel classification method as discussed above (FIG. 5). These perfused pixels are marked by the binary mask in the region of interest. Since the number of pixels is small, this implementation can be done fast using the binary sequence of 1's and 0's as labels.

The following texture features are useful measures for such images. If p(i,j) is the (i,j)-th entry in a normalized gray tone spatial dependence matrix or co-occurrence matrix, given as P(i,j)/R and Ng is the number of distinct gray levels in the quantified image, then the following properties are used for computing the texture features:

(i) Marginal Probability $p_x(i)$:

It is the i-th entry in the marginal-probability matrix obtained by summing the rows of p(i,j).

$$p_x(i) = \sum_{j=1}^{Ng} P(i, j)$$

(ii) Marginal Probability $p_y(i)$:

It is the i-th entry in the marginal probability matrix obtained by summing the rows of p(i,j):

$$p_y(i) = \sum_{j=1}^{Ng} P(i, j)$$

(iii) Joint Summed Marginal Probability of x and y $p_{x+y}$ (I):

This is the joined added marginal probability of x and y.

$$p_{x+y}(k) = \sum_{i=1}^{Ng} \sum_{j=1}^{Ng} p(i, j), k = 2, 3, \ldots 2Ng \quad \text{Note } i + j = k$$

(iv) Joint Subtracted Marginal Probability of x and y, $P_{x-y}$ (I):

This is the joined subtracted marginal probability of x and y.

$$p_{x-y}(k) = \sum_{i=1}^{Ng} \sum_{j=1}^{Ng} p(i, j), k = 2, 3, \ldots Ng - 1$$

(v) Correlation 96:

This is mathematically defined as:

$$f = \frac{\sum_i \sum_j (i, j) p(i, j) - \mu_x \mu_y}{\sigma_x \sigma_y}$$

where, $\mu x$, $\mu y$, $\sigma_x$ and $\sigma_y$ are the mean and standard deviation of $p_x$ and $p_y$.

(vi) Entropy 98:
   This is mathematically defined as:

$$E = -\Sigma_i \Sigma_j p(i,j)[\log(i,j)]$$

(vi) Sum Entropy 98:
   This is mathematically defined as:

$$E_s = -\sum_{i=0}^{Ng-1} p_{x-y}(i) \log[p_{x-y}(i)]$$

(vii) Difference Entropy 98:
   This is mathematically defined as:

$$E_d = -\sum_{i=0}^{Ng-1} p_{x-y}(i) \log[p_{x-y}(i)]$$

Referring back now to FIG. 2, with temporal correction 22, spatial correction 24 and regional correspondence 26 complete, the algorithm checks for consistency 36 and develops perfusion curve data 38 if consistent. If the regional correspondence statistical properties 34 are not consistent, then the system checks the three algorithms 22, 24, 26 for any inconsistencies. This involves how close the transformation matrix was to the previous transformation matrix in the temporal correction block 22 or how good was the pixel classification in terms of the input error threshold 78 (FIG. 5). Similarly, the statistical values are checked for closeness in the temporal domain 26. If no abnormalities are encountered, then we go to the quantification stage 28, were we compute the uptake curve and characterize the lesion.

Suitable processes of perfusion quantification includes statistical computations, such as mean and variance. If $I_i(t)$ is the pixel intensity at a location i in the vector of length T corresponding to the pixel location (x,y) for the temporal sequence "t" (out of T frames), we can compute the mean for the region of interest for a temporal frame "t", mean of the region of interest over all the temporal frames and the standard deviation of the mean value as:

$$\mu_{roi}(t) = \frac{1}{N} \sum_{i=1}^{i=N} I_i(t)$$

$$\bar{\mu}_{roi} = \frac{1}{N} \sum_{i=1}^{i=N} \mu_{roi}(t)$$

$$\sigma_{roi} = \sqrt{\frac{\sum_{t=1}^{t=T} (\mu_{roi}(t) - \bar{\mu}_{roi})(\mu_{roi}(t) - \bar{\mu}_{roi})}{N}}$$

Having performed the quantification of perfusion data sets, we can also characterize the lesions in the ROI. First, for simple image differencing, in the image subtraction mode, one can display plain subtraction, scaled subtraction, divided, and ratio images. To implement this operation, a user first selects a reference frame (e.g. A). The default frame, e.g. B, will be operated with respect to the reference frame A. Mathematically, these four modes are given as: (i) Straight subtraction: A−B, (ii) Scaled subtraction: (A−B) * k1, (iii) Division A/B*k2 and (iv) Ratio: (A−B/B)*k3. Here, k1, k2, k3 are scaling factors usually chosen to be 100, 1,000, 10,000. These four modes operate in a mutually exclusive mode or in a toggle mode.

Secondly, for image mapping velocity thresholding the percentage change of intensity values from one time frame to another time frame is determined. Another way to interpret this is to calculate how rapidly the Gad perfused in the breast when two time frame images were acquired. It is a very useful clinical tool to study the change in the contrast near or around the lesion. What percentage of Gad flows near the lesion when moved from one time frame to the next time frame can be evaluated. Since the rapidity of flow of the Gad is measured between the two time frames, one therefore needs to decide how the Gad flow rate is parameterized or mapped to visualize it. This mapping is achieved by setting at a user-specified threshold value, so-called the percentage velocity threshold. This threshold is then applied to the intensity of the first frame (previous frame) and the new intensity value is computed (so-called, the threshold intensity value). Next, we compare this new intensity value with respect to the second frame's intensity value. If the second frame intensity value is more than the threshold intensity value, then the pixel is given a color (say blue). This is done on a pixel-by-pixel basis for the entire image. On visualizing the velocity parametric mapped image, we see color pixels as those pixels that received more Gad compared to the previous image by a threshold amount. This threshold is user-specified. A suitable threshold value is around 20 percent, which means the parametric image will show any change in the Gad (or contrast in pixels) by 10 percent in the next image compared to the previous image. Simplified, pixel change is inversely proportional to the threshold value. The higher the velocity threshold, the lower is the pixel change between the time frames of the images.

This supports two types of methods for lesion characterizations. (i) Maximum Derivative, and (ii) Steep Slope. In the Maximum Derivative approach, we compute the image differences followed by maximum intensity selection. If the temporal sequence has "T" frames, one can compute T−1 difference images. Now for each pixel location (x,y), we compute the maximum intensity value which corresponds to the maximum derivative of the temporal sequence. This method is very similar to the well-known maximum intensity projection (MIP) method, the only difference lies in its inclusion of the subtracted images before running the MIP. In the steep slope method, one can compute the correct signal intensity, given the previous and next image frames. It is mathematically computed as: S(previous)−S(end)/{t*S(base)*c}, where S(previous) is the intensity value of the previous frame at (x,y) location, S(end) is the intensity value at the last frame at pixel location (x,y), t is the time difference, S(base) is the base or normalized intensity and c is the constant.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of medical perfusion imaging including:
   introducing a contact agent which is absorbed by cells of tissue of interest into a subject;
   generating a series of temporally displaced images as the agent is absorbed, the temporally displaced images being spatially offset due to subject motion;
   correcting for the subject motion in the series of temporally spaced images;
   selecting a plurality of pixels corresponding to the tissue of interest in a region of interest spatially within each of the images based on common characteristics of the pixels; and for the selected pixels, computing an imaqeable agent uptake curve indicative of absorption of the contrast agent over time from corresponding pixels of the temporally displaced images.

2. The method of medical imaging as set forth in claim 1, further including:
verifying correspondence of the selected pixels in each of the temporally spaced images.

3. The method of medical imaging as set forth in claim 2, wherein the verifying includes:
computing co-occurrence matrices between successive images based on texture, each co-occurrence matrix indicative of similarity of contrast agent perfused pixels in successive images.

4. The method of medical imaging as set forth in claim 3, further including:
generating binary masks from pixel classifications in the region of interest for establishing textural correspondence of the selected pixels.

5. The method of medical imaging as set forth in claim 4, further including:
computing textural properties of the selected pixels from the generated binary mask.

6. The method of medical imaging as set forth in claim 1, further including:
displaying the contrast agent uptake curve.

7. The method of medical imaging as set forth in claim 1, wherein the selecting includes:
classifying pixels in the region of interest based on a tissue characteristic determinable for each pixel.

8. The method of medical imaging as set forth in claim 7, wherein the selecting further includes:
selecting one of the classifications of pixels as a class of pixels expected to react with the contrast agent.

9. A method of medical perfusion imaging including:
correcting for patient motion in a series of temporally spaced images, the patient motion correction including:
identifying a sub-set of pixels in each temporally spaced image; and
deriving a relationship between successive sub-sets to describe patient motion between temporally displaced images;
selecting a Plurality of pixels in a region of interest spatially within each of the images based on common characteristics for the pixels; and
for the selected pixels, generating a contrast agent uptake curve indicative of absorption of the contrast agent over time.

10. The method of medical imaging as set forth in claim 9, wherein the identifying includes:
successively down sampling and smoothing pixels into progressively smaller sub-sets of pixels in the temporally spaced images until successive sub-sets converge.

11. A method of medical perfusion imaging in an organ in a torso region of a subject, which organ undergoes motion during the perfusion imaging, the method comprising:
generating a reference image of the organ of interest;
identifying a subset of pixels representative of the organ of interest;
injecting the patient with an imageable agent which is selectively absorbed by tissue of interest within the organ of interest;
generating a series of temporally displaced images of the organ of interest;
aligning each of the temporally displaced images including:
minimizing entropy of the sub-set of pixels between successive temporally spaced images;
for image pixels corresponding to the tissue of interest, computing an uptake curve indicative of absorption of the imageable agent over time from the aligned temporally displaced images.

12. A diagnostic imaging system comprising:
an image memory for storing a plurality of temporally spaced digital image representations reconstructed from diagnostic data generated by an imaging device, the image representation including a region of interest which is spatially displaced in some images relative to others; and
a perfusion processor including a motion correcting algorithm that registers the plurality of digital image representations, a filtration algorithm that selects pixels of a preselected classification in the region of interest from each of the digital image representations, and a verification algorithm which verifies spatial alignment of the selected pixels of the preselected classification over successive digital image representations.

13. A diagnostic imaging system comprising:
an image memory for storing a plurality of temporally spaced digital image representations reconstructed from diagnostic data generated by an imaging device; and
a processor including a motion correcting algorithm that registers the plurality of digital image representations, a filtration algorithm that spatially classifies pixels in a region of interest on each of the digital image representations, and a verification algorithm which establishes correspondence between selected classified pixels over successive digital image representations, the motion correcting algorithm including:
a first window including a selected number of pixels from a first digital image representation;
a second window including a selected number of pixels from a second digital image representation; and
a comparator which recursively compares the first window and the second window until differences are minimized.

14. The diagnostic imaging system as set forth in claim 12, wherein the verification algorithm includes:
a co-occurrence matrix computer which computes matrices based on a texture parameter of the selected pixels across successive image representations.

15. The diagnostic imaging system as set forth in claim 12, wherein the filtration algorithm includes:
an algorithm which assigns a value to each pixel in the image representation based on a characteristic of the pixel;
an algorithm which selects pixels representing a characteristic of interest; and
an algorithm which excludes pixels of other than the selected pixels.

16. The diagnostic imaging system as set forth in claim 13, wherein the comparator includes:
a transform defining a relationship between pixels in the first window and the second window when the differences are minimized, the comparator applying the transform to the digital image representations.

17. In a medical imaging system including an imaging device for producing a plurality of temporally spaced image representation, a memory for storing the image representations, and a processor for manipulating the image representations for viewing on a display, a method of controlling the processor including the computer implemented steps of:

aligning the plurality of temporally spaced image representations;

sorting selected pixels in the region of interest spatially within each of the image representations for further processing;

establishing correspondence between the selected pixels over successive image representations; and determining a curve indicative of a presence of a contrast agent in the selected pixels over time.

18. The medical imaging system as set forth in claim 17, wherein the computer implemented sorting includes:

classifying pixels in the image representations according to a characteristic indicative of an absorption rate of the contrast agent.

19. The medical imaging system as set forth in claim 18, wherein the computer implemented establishing includes:

generating masks for a particular classification of pixels;

based on the generated masks, computing textural properties of the particular classification of pixels across the temporally spaced image representations; and computing co-occurrence matrices between successive image representations based on the textural properties, each co-occurrence matric indicative of contrast agent perfusion in pixels of adjacent image representations.

20. A medical imaging system including an imaging device for producing a plurality of temporally spaced image representations, a memory for storing the image representations, and a processor for manipulating the image representations for viewing on a display, the processor performing the steps of:

iteratively deriving a transform between progressively smaller sub-sets of pixels in temporally adjacent image representations until the sub-sets converge;

applying the transform to the temporally adjacent image representations to align the adjacent image representations;

sorting selected pixels in a region of interest within each of the image;representations for further processing;

establishing correspondence between the selected pixels over successive image representations; and determining a curve indicative of a change in contrast agent presence in the selected pixels over time.

* * * * *